United States Patent [19]

El-Hamamsy et al.

[11] Patent Number: 5,134,345
[45] Date of Patent: Jul. 28, 1992

[54] FEEDBACK SYSTEM FOR STABILIZING THE ARC DISCHARGE OF A HIGH INTENSITY DISCHARGE LAMP

[75] Inventors: Sayed-Amr A. El-Hamamsy, Schenectady; Victor D. Roberts, Burnt Hills, both of N.Y.

[73] Assignee: General Electric Company, Schenectady, N.Y.

[21] Appl. No.: 785,676

[22] Filed: Oct. 31, 1991

[51] Int. Cl.$^5$ ............................................. H05B 41/24
[52] U.S. Cl. ..................................... 315/248; 315/307; 315/DIG. 7
[58] Field of Search .................. 315/307, 308, 209 R, 315/227 R, DIG. 5, DIG. 7, 219, 291, 248

[56] References Cited

U.S. PATENT DOCUMENTS

| | | | |
|---|---|---|---|
| 3,662,216 | 5/1972 | Hildebrant | 315/205 |
| 4,277,728 | 7/1981 | Stevens | 315/DIG. 7 |
| 4,383,203 | 5/1983 | Stanley | 315/248 |
| 4,783,615 | 11/1988 | Dakin | 315/248 |
| 4,791,338 | 12/1988 | Dean | 315/DIG. 7 |
| 4,812,702 | 3/1989 | Anderson | 313/153 |
| 5,023,566 | 6/1991 | El-Hamamsy et al. | 330/251 |
| 5,039,903 | 8/1991 | Farrall | 313/160 |
| 5,063,332 | 11/1991 | El-Hamamsy | 315/311 |

Primary Examiner—Eugene R. LaRoche
Assistant Examiner—A. Zarabian
Attorney, Agent, or Firm—Jill M. Breedlove; James C. Davis, Jr.; Marvin Snyder

[57] ABSTRACT

A feedback system for a high intensity discharge lamp detects arc instabilities and stabilizes the discharge, thereby increasing the useful life of the lamp. The feedback system includes a phase detector circuit for detecting relatively low fequency, recurrent variations in the characteristic of the arc discharge, indicating the onset of an arc instability. As a result, a signal is generated to decrease the power supplied to the lamp by an amount sufficient to stabilize the discharge without a significant decrease in visible light output.

5 Claims, 1 Drawing Sheet

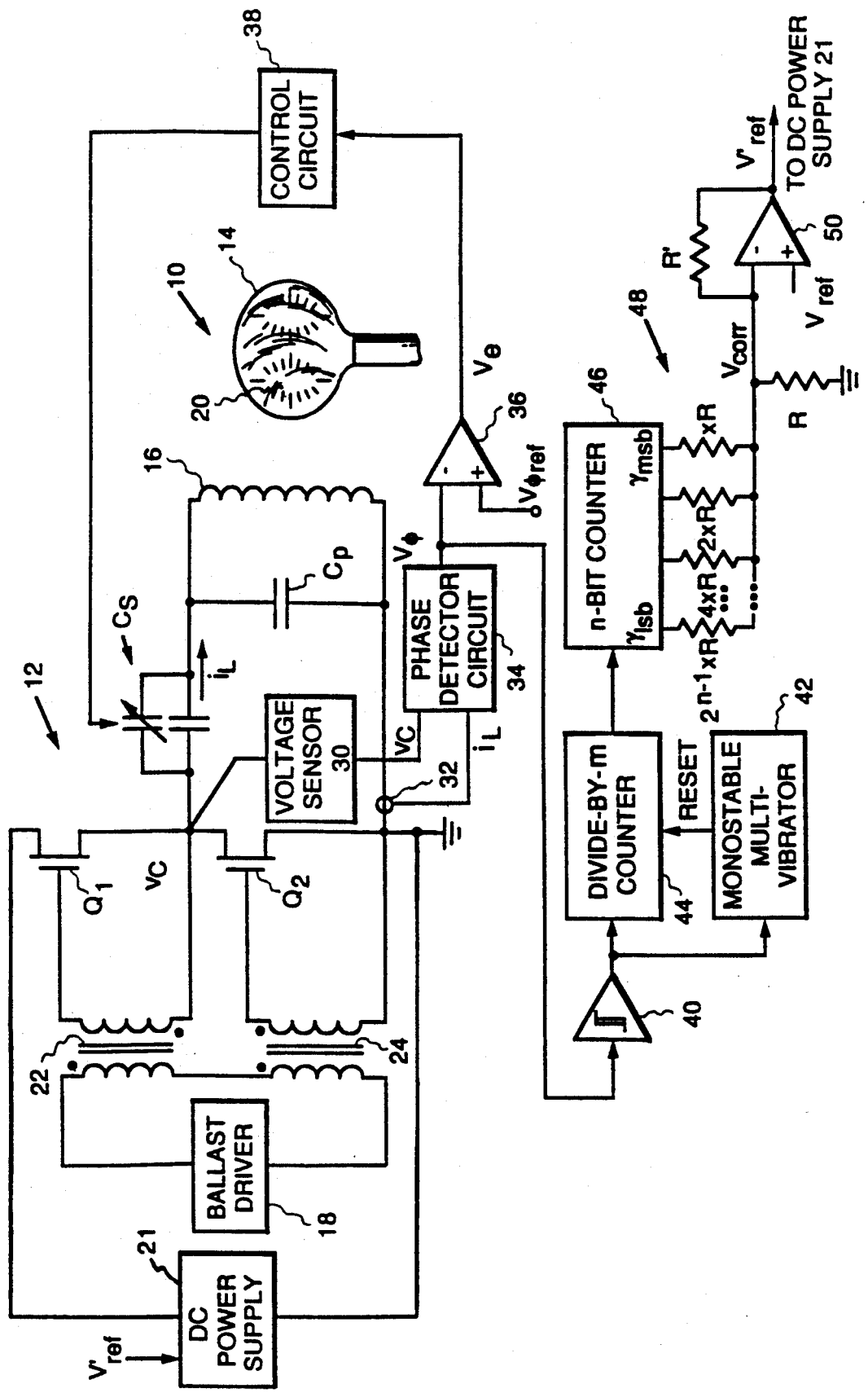

FEEDBACK SYSTEM FOR STABILIZING THE ARC DISCHARGE OF A HIGH INTENSITY DISCHARGE LAMP

FIELD OF THE INVENTION

The present invention relates generally to high intensity discharge lamps. More particularly, the present invention relates to a feedback system for detecting the onset of arc instability and for automatically reducing the power supplied to the lamp in order to stabilize the discharge, thereby extending the useful life of the lamp.

BACKGROUND OF THE INVENTION

A common problem with high intensity discharge (HID) lamps is that, after an extended period of operation, the arc becomes unstable, causing the light output from the lamp to flicker. Such arc instability is believed to be controlled by a number of factors including: arc tube shape; composition of the metal halide fill; amount of free halide in the arc tube during lamp operation; arc tube operating power; and the temperature of a liquid pool of metal halide that forms in the lamp during lamp operation.

One approach to avoiding arc instability involves reducing the rate of free halide buildup in the arc tube. For example, as described in commonly assigned U.S. Pat. No. 5,507,751 of Witting et.al., issued Oct. 15, 1991 and incorporated by reference herein, a protective silicon coating of sufficient thickness may be applied to the inner surface of the arc tube to avoid a substantial loss of the metallic component of the fill and hence a corresponding buildup of free halide. By thus avoiding arc instability, the useful life of the arc tube is extended.

Although reducing the rate of free halide buildup, such as by the method of Witting et.al., U.S. Pat. No. 5,057,751 cited hereinabove, is effective in extending the useful life of the arc tube of an HID lamp, it is desirable to extend that life even further. Accordingly, it is an object of the present invention to avoid arc instability in an HID lamp in order to extend the useful life thereof.

SUMMARY OF THE INVENTION

A feedback system for an HID lamp detects arc instabilities and stabilizes the discharge. The feedback system includes a phase detector circuit for detecting relatively low frequency, recurrent variations in the characteristic of the arc discharge, indicating the onset of an arc instability. As a result, a signal is generated to decrease the power supplied to the lamp by an amount sufficient to stabilize the discharge without a significant decrease in visible light output.

According to a preferred embodiment, the output signal from the phase detector circuit is supplied to a Schmidt trigger which generates a square wave having a frequency corresponding to the phase detector output. The square wave is provided to a divide-by-m counter and also to a monostable multivibrator having a predetermined time constant. The monostable multivibrator provides the reset signal for the divide-by-m counter. In this way, power reduction to the lamp is only initiated if m cycles of instability occur in a given time, thereby avoiding the effect of glitches or other single-occurrence events. The output signal from the divide-by-m counter is provided to an n-bit counter, where $2^n - 1$ is equal to the number of levels of power reduction to the lamp. A resistive network is coupled at the output of the n-bit counter, one terminal of each resistor being coupled to an output bit of the n-bit counter and the other terminal of each resistor being coupled together at the inverting input of an operational amplifier which generates the reduced voltage signal to the lamp. The resistors are in the ratio $1:2:4:8: \ldots 2^{n-1}$ from the most significant bit to the least significant bit, respectively. The percentage power reduction per level depends upon the acceptable total light output reduction and the desired amount by which the useful life of the lamp is to be extended.

BRIEF DESCRIPTION OF THE DRAWINGS

The features and advantages of the present invention will become apparent from the following detailed description of the invention when read with the sole accompanying drawing FIGURE which schematically illustrates a feedback system for stabilizing the discharge of an HID lamp in accordance with a preferred embodiment of the present invention.

DETAILED DESCRIPTION OF THE INVENTION

The drawing FIGURE illustrates an HID lamp system employing a feedback system for detecting the onset of arc instability in an HID lamp 10 and for stabilizing the discharge in accordance with the present invention. By way of example, HID lamp 10 is illustrated in the drawing FIG. as comprising an electrodeless HID lamp. However, it is to be understood that the principles of the present invention apply equally to HID lamps having electrodes.

As shown in the drawing FIG., HID lamp 10 includes an arc tube 14 formed of a high-temperature glass, such as fused quartz, or an optically transparent ceramic, such as polycrystalline alumina. Arc tube 14 contains a fill which may comprise at least one metal halide, such as sodium iodide, and a buffer gas, such as xenon. Electrical power is applied to the HID lamp by an excitation coil 16 disposed about arc tube 14 which is driven by an RF signal via a ballast driver 18 and ballast 12. (For clarity of illustration, coil 16 is not shown in its operational position about arc tube 14.) A suitable excitation coil 16 may comprise, for example, a two-turn coil having a configuration such as that described in commonly assigned, U.S. Pat. No. 5,039,903 of G. A. Farrall, which patent is incorporated by reference herein. Such a coil configuration results in very high efficiency and causes only minimal blockage of light from the lamp. The overall shape of the excitation coil of the Farrall patent is generally that of a surface formed by rotating a bilaterally symmetrical trapezoid about a coil center line situated in the same plane as the trapezoid, but which line does not intersect the trapezoid. However, another suitable coil configuration is described in commonly assigned U.S. Pat. No. 4,812,702 of J. M. Anderson, issued Mar. 14, 1989, which patent is incorporated by reference herein. In particular, the Anderson patent describes a coil having six turns which are arranged to have a substantially V-shaped cross section on each side of a coil center line. Still another suitable excitation coil may be of solenoidal shape, for example.

In operation, RF current in coil 16 results in a time-varying magnetic field which produces within arc tube 14 an electric field that completely closes upon itself. Current flows through the fill within arc tube 14 as a result of this solenoidal electric field, producing a toroidal arc discharge 20 in arc tube 14. The operation of an exemplary HID lamp is described in commonly assigned Dakin U.S. Pat. No. 4,783,615, issued on Nov. 8, 1988, which patent is incorporated by reference herein.

In the drawing FIG., ballast 12 is shown as comprising a Class-D power amplifier including two switching devices $Q_1$ and $Q_2$ connected in series with a dc power supply 21 in a half-bridge configuration. Switching devices $Q_1$ and $Q_2$ are illustrated as MOSFET's, but other types of switching devices having capacitive gates may be used, such as insulated gate bipolar transistors (IGBT's) or MOS-controlled thyristors (MCT's). Switching devices $Q_1$ and $Q_2$ are coupled to ballast driver 18 via input isolation transformers 22 and 24, respectively. In operation, the switching devices are driven alternately between cutoff and saturation such that one is conducting while the other one is turned off and vice versa. Hence, the Class-D ballast may be conveniently driven by a square wave signal. Alternatively, ballast driver 18 may comprise means for generating two out-of-phase sinusoidal signals, as described in commonly assigned U.S. Pat. No. 5,023,566 of S. A. El-Hamamsy and G. Jernakoff, which patent is incorporated by reference herein.

As in any Class-D circuit, a resonant load network is connected to the half-bridge at the junction between switching devices $Q_1$ and $Q_2$. Such a resonant load network may comprise a series, parallel or series/parallel resonant circuit, depending on the application. In accordance with the present invention, however, the resonant circuit preferably has a variable impedance, e.g. by including a variable capacitance, a variable inductance, or a combination thereof.

In the HID lamp system illustrated in the drawing FIG., the resonant load network includes a variable capacitor $C_s$ which is employed both for resonant circuit tuning and blocking dc voltage. The variable capacitor $C_a$ is connected in series with the parallel combination of the excitation coil 16 of HID lamp 10 and a tuning capacitor $C_p$. The parallel combination of capacitor $C_P$ and coil 16 functions as an impedance transformer to reflect the impedance of the arc discharge 20 into the ballast load.

A suitable variable capacitor $C_s$ may be of a type described in commonly assigned U.S. Pat. No. 5,075,600 of S. A. El-Hamamsy and J. C. Borowiec, issued Dec. 24, 1991 1990, which is now allowed and incorporated by reference herein. In particular, the variable capacitor of the El-Hamamsy and Borowiec patent comprises a fixed conductive plate and a substantially parallel, movable conductive plate with a dielectric disposed therebetween. Piezoelectric actuating means is used to vary the distance between the conductive plates by moving the movable plate with respect to the fixed plate. As a result, capacitance changes in inverse proportion to the distance moved. A control signal is provided to activate the piezoelectric actuating means to move the movable conductive plate. The control signal may provide either discrete control for movement of the movable conductive plate between a discrete number of predetermined operating positions, or it may provide continuous control for movement over a range of positions. Another suitable type of variable capacitor is a liquid crystal variable capacitor, such as that described in commonly assigned U.S. Pat. Ser. No. 5,084,801 of S. A. El-Hamamsy and C. P. Yakymyshyn, issued Jan. 28, 1992 and incorporated by reference herein.

As described in El-Hamamsy et.al. U.S. Pat. No. 5,075,600 cited hereinabove, capacitors $C_a$ and $C_p$ are chosen to ensure impedance matching for maximum efficiency. That is, these capacitors are chosen to ensure that the ballast load is designed for optimum values of resistance and phase angle. As described hereinabove, the excitation coil of the HID lamp acts as the primary of a loosely-coupled transformer, while the arc discharge acts as both a single-turn secondary and secondary load. The impedance of the arc discharge is reflected to the primary, or excitation coil, side of this loosely-coupled transformer. To match the ballast load impedance for maximum efficiency, the parallel capacitor operates with the excitation coil to match the proper resistive load value, and the series capacitor acts with the combination of the excitation coil and parallel capacitor to yield the required phase angle.

In the feedback system shown in the drawing FIG., the resonant output circuit voltage $v_c$ is sensed by a voltage sensor 30, and the resonant output circuit current $i_L$ is sensed by a current sensor 32. A suitable voltage sensor may comprise, for example, a voltage dividing network of resistors or capacitors. A suitable current sensor may comprise, for example, a Hall-effect sensor or a current viewing resistor, such as that described in commonly assigned, copending U.S. Pat. application of S. A. El-Hamamsy, Ser. No. 632,213, filed Dec. 21, 1990, now allowed and incorporated by reference herein. The sensed voltage and current are provided as input signals to a phase detector circuit 34 for determining the phase angle $\phi$ therebetween. The output signal from phase detector 34 comprises a voltage $V_\phi$ proportional to the measured phase angle $\phi$. As described in commonly assigned U.S. Pat. No. 5,063,332 of S. A. El-Hamamsy and J. C. Borowiec, issued Nov. 5, 1991, which is incorporated by reference herein, the voltage $V_\phi$ is compared in an error amplifier 36 to a reference voltage $V_{\phi ref}$, and the resulting error Signal $V_e$ is supplied as the input to a control circuit 38 for continuously tuning the variable capacitor $C_s$ during all operating conditions, thereby maximizing efficiency.

In accordance with the present invention, the output of phase detector circuit 34 is also provided, via another path, to a Schmidt trigger 40, of a type well-known in the art, for generating a square wave signal at the frequency of the output signal from phase detector circuit 34. In particular, at the onset of an arc instability, there is a relatively slow variation in the load impedance of the ballast which is manifested as a change in phase angle $\phi$ of the resonant load circuit at a relatively low frequency, e.g. 1 Hz. The Schmidt trigger and phase detector combination detects phase angle variations above a predetermined threshold phase variation. The square wave signal from the Schmidt trigger is provided to a monostable multivibrator 42 having a time constant $\tau_{mv}$ that depends on a predetermined threshold frequency of arc instability. The square wave signal from Schmidt trigger 40 is also provided to a divide-by-m counter 44. The falling edge of the multivibrator output signal provides the reset signal for divide-by-m counter 44. As a result, a pulse will be generated to the n-bit counter if and only if there are m cycles of instability during a time equal to $m\tau_{mv}$. The output signal from divide-by-m counter 44 is provided to an n-bit counter 46 which generates a correction signal $V_{corr}$ via a resistive network 48, one terminal of each resistor being coupled to a corresponding output bit of n-bit counter 46. Specifically, the resistors are in the ratio 1:2:4:8: . . .

$2^n-1$ from the most significant bit $\gamma_{msb}$ to the least significant bit $\gamma_{lsb}$, respectively, where $2^n-1$ is equal to the number of levels of power reduction to the lamp. The other terminal of each resistor is coupled to the inverting input of an operational amplifier 50. A resistor R is coupled between the inverting input and ground. In addition, a feedback resistor R' is coupled between the output of operational amplifier 50 and the inverting input thereof. The Output signal $V_{ref}'$ from operational amplifier 50 is the control signal which determines the output voltage of dc supply 21. For example, the voltage $V_{ref}'$ could be used to set the steady state duty ratio of a pulse width modulated converter or the switching frequency of a resonant converter, both of which converter types are well-known to those skilled in the art. When $V_{ref}'$ is reduced, as described hereinbelow, the output voltage of the dc supply is also reduced; hence, the output power is reduced.

In operation, a reference voltage $V_{ref}$ is applied to the non-inverting input of operational amplifier 50. If the frequency of the square wave signal from Schmidt trigger 0 is less than the time constant of multivibrator 42, then an arc instability has not been detected, and operation continues with no reduction in power to the lamp since the falling edge of multivibrator 42 resets the divide-by-m counter to zero. As a result, the output of n-bit counter 46 is equal to zero, and the output voltage $V_{ref}'$ from operational amplifier 50 is represented as:

$$V_{ref}' = \frac{R'}{R} V_{ref}$$

On the other hand, if the frequency of the square wave signal from Schmidt trigger 40 is greater than the time constant of multivibrator 42, then the resulting clock pulses provided to n-bit counter 46 from divide-by-m counter 44 cause the output from n-bit counter 46 to increase by one for every clock pulse received, i.e., for every m cycles of instability detected. Each clock pulse corresponds to a level of power reduction to the lamp. Specifically, the power to the lamp is reduced by a predetermined percentage at each level, depending upon the acceptable level of light output reduction and the desired extension of arc tube life. For example, a preferred range of power reduction per level is from approximately 1 to 20 Watts/level, with a more preferred range being from 2 to 10 Watts/level. The percentage voltage reduction per level is set by the ratio of the resistance R to the least significant bit resistance $2^{n-1} \times R$. The number of levels of power reduction is equal to $2^n-1$. An exemplary range of values for n may be from 3 to 5.

If the high logic level of n-bit counter 46 is set to $V_H$, then the output of operational amplifier 50 is given by:

$$V_{ref}' = \frac{R'}{R} V_{ref} - \left( 2^{n-1} \frac{R'}{2^{n-1} \times R} \gamma_{msb} + \ldots + \frac{R'}{2^{n-1} \times R} \gamma_{msb} + \ldots + 2^{n-1} \frac{R'}{2^{n-1} \times R} \gamma_{lsb} + \ldots + \frac{R'}{2^{n-1} \times R} \gamma_{lsb} \right) V_H$$

As a simplification, the high logic level on n-bit counter 50 may be set to $V_{ref}$ so that the above expression for $V_{ref}'$ becomes:

$$V_{ref}' = \left( \frac{R'}{R} - \left[ \left( 2^{n-1} \frac{R'}{2^{n-1} \times R} + \ldots + \frac{R'}{2^{n-1} \times R} \right) \gamma_{msb} + \ldots + \left( 2^{n-1} \frac{R'}{2^{n-1} \times R} + \ldots + \frac{R'}{2^{n-1} \times R} \right) \gamma_{lsb} \right] \right) V_{ref}$$

According to one preferred embodiment, n-bit counter 46 includes non-volatile memory to maintain the state thereof when the ballast is turned off. When the ballast is turned on again, the control voltage is reset to provide the same power level as before it was turned off. This can be accomplished by operating the n-bit counter from a small auxiliary power supply, e.g., a well-known combination of a dropping resistor and a Zener diode.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. In a high intensity discharge lamp system of the type including a ballast having a resonant output circuit, a feedback system for detecting the onset of arc instability in the lamp and for stabilizing the arc discharge, comprising:

phase detecting means for detecting the phase angle between the resonant output circuit current and the resonant output circuit voltage;

instability detecting means for receiving the phase angle from said phase detecting means and detecting variations therein above a predetermined threshold phase variation occurring at a frequency greater than a predetermined threshold frequency, said instability detecting means indicating the onset of arc instability whenever said variations exceed a predetermined number within a predetermined time period; and stabilizing means for generating a correction signal in response to said instability detecting means for reducing the power supplied to the lamp by an amount sufficient to stabilize the arc discharge.

2. The feedback system of claim 1 wherein said instability detecting means comprises:

Schmidt trigger means for receiving the phase angle from said phase detecting means and generating a square wave signal at the frequency thereof;

divide-by-m counting means for receiving said square wave signal and generating a clock pulse whenever m cycles of said variations in said phase angle have occurred; and multivibrator means for receiving said square wave signal and generating a reset signal having a predetermined time constant corresponding to said predetermined threshold frequency to said divide-by-m counting means.

3. The feedback system of claim 2 wherein said stabilizing means comprises:

n-bit counting means for generating a count signal in response to said divide-by-m counting means, said count signal having a number of output bits n including a most significant bit $\gamma_{msb}$ and a least significant bit $\gamma_{lsb}$;

a resistive network coupled to the output of said counting means, said resistive network comprising a plurality of resistors having values $\times R$, $2 \times R$, $4 \times R$, ... $2^{n-1} \times R$ in the ratio $1:2:4:8:\ldots 2^{n-1}$, one terminal of each of said resistors in the ratio $1:2:4:8:\ldots 2^{n-1}$ respectively being coupled to one of said output bits of said counting means from the most significant bit to the least significant bit, respectively, the other terminal of each of said resistors being coupled together; and an operational amplifier having an input resistor R coupled to the inverting input thereof and further having a feedback resistor R' coupled between the output and the inverting input thereof, said other terminal of each of said resistors of said resistive network being coupled to the inverting input of said operational amplifier, said operational amplifier generating a reduced reference voltage $V_{ref}'$ to the lamp for reducing the power supplied thereto whenever said count signal is greater than zero, said reduced reference voltage being represented by the expression:

$$V_{ref}' = \frac{R'}{R} V_{ref} - \left( 2^{n-1} \frac{R'}{2^{n-1} \times R} \gamma_{msb} + \ldots + \frac{R'}{2^{n-1} \times R} \gamma_{msb} + \ldots + 2^{n-1} \frac{R'}{2^{n-1} \times R} \gamma_{lsb} + \ldots + \frac{R'}{2^{n-1} \times R} \gamma_{lsb} \right) V_H.$$

where $V_{ref}$ represents the reference voltage to the lamp before reducing the power supplied thereto, and $V_H$ represents the high logic level of said counting means.

4. The feedback system of claim 3 wherein said n-bit counting means further comprises a non-volatile memory for maintaining the state thereof when power is removed therefrom so that substantially the same voltage $V_{ref}'$ is applied to the lamp upon the reactivation thereof.

5. The feedback system of claim 1 wherein said ballast comprises a Class-D power amplifier circuit having a variable impedance, said feedback system further comprising:

a phase control feedback loop, including said phase detecting means, for varying the phase angle of the resonant circuit current to tune said resonant output circuit under different load conditions.

* * * * *